United States Patent
Midgley et al.

(10) Patent No.: US 8,543,797 B1
(45) Date of Patent: Sep. 24, 2013

(54) MANAGED DESKTOP SYSTEM

(75) Inventors: Christopher W. Midgley, Northborough, MA (US); John Webb, Sutton, MA (US); Manuel Gonsalves, Westborough, MA (US)

(73) Assignee: Unidesk Corporation, Marlborough, MA (US)

( * ) Notice: Subject to any disclaimer, the term of this patent is extended or adjusted under 35 U.S.C. 154(b) by 0 days.

(21) Appl. No.: 13/234,474

(22) Filed: Sep. 16, 2011

Related U.S. Application Data

(63) Continuation of application No. 12/370,719, filed on Feb. 13, 2009, now Pat. No. 8,386,757.

(51) Int. Cl.
*G06F 9/24* (2006.01)
*G06F 15/177* (2006.01)

(52) U.S. Cl.
USPC .................................................. 713/1; 713/2

(58) Field of Classification Search
USPC ....................................................... 713/1, 2
See application file for complete search history.

(56) References Cited

U.S. PATENT DOCUMENTS

| | | | | |
|---|---|---|---|---|
| 7,233,985 B2* | 6/2007 | Hahn et al. | | 709/222 |
| 2005/0144431 A1* | 6/2005 | Lin et al. | | 713/1 |
| 2006/0277542 A1* | 12/2006 | Wipfel | | 717/174 |
| 2008/0091929 A1* | 4/2008 | Oberhaus et al. | | 713/1 |
| 2009/0198805 A1* | 8/2009 | Ben-Shaul et al. | | 709/222 |
| 2009/0260007 A1* | 10/2009 | Beaty et al. | | 718/1 |
| 2009/0327675 A1* | 12/2009 | Cherian et al. | | 713/1 |
| 2010/0037041 A1* | 2/2010 | Joshi et al. | | 713/2 |
| 2010/0107113 A1* | 4/2010 | Innes et al. | | 715/779 |

* cited by examiner

*Primary Examiner* — Vincent Tran
(74) *Attorney, Agent, or Firm* — Clock Tower Law Group; Erik J. Heels; Michael A. Bartley

(57) ABSTRACT

A method and system of operating an actual or virtual desktop or server and managing such desktops and servers involves a cache appliance serving desktop, operating system, and application objects to a managed machine. The objects are composited together to present a normal file structure to the user, with all user configuration and data stored in the desktop object. Management requirements are minimized to maintain operating system and application objects, while users maintain distinct and customizable desktops.

5 Claims, 6 Drawing Sheets

MANAGED DESKTOP SYSTEM

CROSS-REFERENCE TO RELATED APPLICATIONS

This utility patent application is a continuation of and claims priority from U.S. patent application Ser. No. 12/370,719, filed Feb. 13, 2009, now U.S. Pat. No. 8,386,757 titled "MANAGED DESKTOP SYSTEM" in the name of Christopher W. Midgley, John Webb, and Manuel Gonsalves, which is hereby fully incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2008-2011 Unidesk Corporation.

BACKGROUND

1. Technological Field

This disclosure relates to computer systems and more particularly to managed computer systems in multi-computer environments running virtual desktops.

2. Background

Companies that have large work forces struggle with the cost and complexity of managing their diverse collection of desktops, laptops, servers, and other computing devices. While they may use technologies to help them provision or build new desktops, it doesn't take long before each of these computers diverge, creating potentially tens if not hundreds of thousands of individual computers requiring management. Companies attempt to address this problem by using complex software distribution automation systems, yet due to the unique and unmanaged characteristics of desktops these solutions commonly fail ten to twenty percent of the time resulting in large numbers of open trouble tickets every time they attempt a patch or upgrade. While Information Technology (IT) departments would prefer to freeze or lock down desktops so users cannot change them, employees generally lose productivity and job satisfaction when faced with uncustomizable desktops, resulting in IT allowing various amounts of end user control. Further, repairing broken desktops, including those that no longer work well because users have installed software that has degraded the stability of the machine is complex requiring highly skilled IT staff. More commonly, rather than repairing the desktop, IT will simply install a new gold image, or fresh and complete copy of a computer system, which may cause the computer user to lose extended time reverting and reconfiguring their computer and recovering from lost data.

Desktop virtualization is a recent trend in managing large numbers of desktops. One solution is to provide a virtual desktop infrastructure and host desktops from a networked server. Such virtualization provides many benefits for desktop management, including centralizing data, improving reliability, simplifying provisioning and improving mean-time-to-repair. However, when it comes to the operating system, applications and user data, virtualization generally only moves the desktop from a physical computer to a virtual one. Instead of operating a unique computer desktop with operating system and applications installed on a local machine, computer users operate a unique computer desktop with operating system and applications installed on a remote server. This may provide a centralized location for IT staff to manage all systems, but IT administrators still struggle with managing vast numbers of unique machines. Computer users gain mobility by being able to connect and access their unique desktop from any system able to connect to the desktop server, but this desktop is generally tied into the system and requires high speed connectivity to the server to function.

Another desktop virtualization solution is to operate desktops on local computers on top of hypervisor platforms. The functioning desktop communicates with the hypervisor, which runs either as a Type 2 hypervisor on top of an already running operating system or as a Type 1 hypervisor directly on local hardware. Type 2 is the most common desktop solution, and adds the requirement of operating and maintaining the local operating system on top of which the hypervisor runs. Both Type 1 and Type 2 provide benefits of increased mobility of desktops between physical machines running the same hypervisor platform and enabling multiple operating systems on the same physical hardware. Management and maintenance of such desktops face similar management and maintenance problems as standard, non-virtualized computer desktops.

DESCRIPTION OF PRIOR ART

There are many current virtualization techniques which focus on different technological aspects in attempts to present various solutions. Key problems include user created conflict and application created conflict. As users customize their desktops, operability problems can arise. Further, as multiple applications are installed, conflicts between applications or the underlying operating system may arise.

One current solution is to virtualize and isolate each application. A self-contained package is created around an application in order to isolate that application from impacting operating system or other application behavior. An optional sandbox may also be created to store allowed user customization of such an application. With such a sandbox, customized changes may be stored in connection with the application, isolated from any other applications or user data, and preserved in desktops regenerated after patching, restoration, or rebuilt for other maintenance reasons. Without sandboxing, customized changes are generally lost when a desktop is regenerated. Isolation of an application, with or without sandboxing, may be performed by filtering file access calls, registry calls and other operating system object management calls made in association with the application and filtering such calls to isolate operating system actions. This isolation protects changes from impacting other applications, but also may prevent beneficial interworking of programs. Software bridges or other means of communication between applications may be built, but native interworking is prevented. For applications which normally modify aspects of operating system objects, copies of such objects may need to be captured and packaged with the isolated application. Isolation of some applications, such as those fully integrated with the operating system, is not possible with this technique.

Another current virtualization solution involves virtualizing boot images. A virtual boot image exists on a networked location, rather than on a local hard drive. This allows mobility between different physical machines while accessing the same actual desktop software. Systems management is centralized such that updates, patches, or restorations may be done at the networked device rather than locally on every desktop. For system management benefits, computer users may by limited to using the networked boot image. This improves manageability but prevents user customization of the operating system or other applications included in the boot image on a per user basis. Creating separate boot images for every user allows customization, but increases management requirements by multiplying the number of images to manage by the number of computer users. This may be reduced by resetting users to a single master image on patches or upgrades, but such action resets or loses all user customizations made prior to the patch or upgrade.

Another current technology includes customization of limited boot images for specific purposes, such as system recovery disks. Such boot images include minimum sets of system resources, such as drivers and executables, to launch an operating system. These generally boot to a functional, yet not fully featured, operating system. They are minimal both for conserving disk space and for including only the smallest set of programs features that might be needed to restore or reinstall an operating system.

What is needed, therefore, is a virtualization platform which allows full user customization of all aspects of desktops while still maintaining minimal, single point management.

BRIEF SUMMARY

This disclosure reveals a system and method for managing and operating real or virtual computer desktops. Virtual desktops are desktop computers run in a virtual environment, wherein either the operating system is running on a remote system or the operating system exists on the local system but in either case is run through a hypervisor. This disclosure reveals a system where Binary Packages are stored on a Cache Appliance or at a location interfaces through a Cache Appliance. Virtual Composition begins with creation of a custom Boot Image for each Managed Desktop. The Boot Image contains all objects from applicable Binary Packages to boot the Managed Desktop to the point where a Composite File System may operate. The Boot Image is launched natively or by a hypervisor on a computer. Once the Composite File System begins operation, data access calls are intercepted and redirected to read or write data included in applicable Binary Packages to complete booting the operating system, loading data, and loading and running applications. Binary Packages are preferably accessed through Cache Appliances, although direct access may also be configured. The Composite File System continues Composite Virtualization merging various Binary Packages together to present a unified namespace and make the separate Binary Packages appear to desktop users as though installed on a computer and stored on a single volume. In a preferred embodiment, user data, configurations, and user installed applications are stored in a Desktop Binary Package that is unique to the user's desktop. In this fashion, Binary Packages having operating systems or applications may be used by many computer users of the system, while each user may customize and use individual desktops through changes to their personal Desktop Binary Package. System administrators benefit by minimizing maintenance, as only Binary Packages need to be managed rather than separate application installations for every user. Disk space is minimized by only requiring one installation in a Binary Package for every operating system or application provided, and centralizing user storage space by also storing user data and customizations through the Cache Appliance. For performance or other reasons, Binary Packages may be replicated and distributed to multiple Cache Appliances, while still maintaining the benefits of single point management. Flexibility is gained by allowing different Cache Appliances to serve different user groups and provide different sets of Binary Packages. Mobility is gained by allowing Cache Appliances to run on the same system as the desktop or allowing direct access to copied Binary Packages, thereby allowing laptop users to bring their Binary Packages with them when disconnected from a networked Cache Appliance. Uniform access is gained by allowing users to cache their personal Desktop Binary Package and connect to different Cache Appliances at different locations. Versioning is enabled by capturing images or snapshots of Binary Packages, allowing users to use earlier versions or configurations if necessary. The user Desktop Binary Package may be further divided into multiple divisions, allowing for application or configuration rollbacks to occur separately from user created data, thereby allowing extensive version control without data loss.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

BINARY PACKAGE is the building block of Composite Virtualization. Binary Packages store data, settings, and executable programs, and are composited together to create a Managed Desktop. Each Binary Package is manageably distinct from other Binary Packages.

BOOT IMAGE is a native format bootable disk. Boot Image contains enough executables, files, and configuration settings for an operating system to boot far enough to start Composite Virtualization.

CACHE APPLIANCE provides access to Binary Packages to Managed Desktops, and each Cache Appliance may replicate Binary Packages for distribution to other Cache Appliances.

COMPOSITE DISK DEVICE DRIVER mounts into an operating system and provides local access to remote Binary Package file volumes.

COMPOSITE FILE SYSTEM coordinates access to Binary Packages through Composite Disk Device Drivers and merges and resolves the files across all Binary Package file volumes into a uniform namespace.

COMPOSITE VIRTUALIZATION is the entire system and method of virtualizing the storage system access by a computer, including its operating system, applications, and user data, configurations and settings, and composites them together to create a working, individual virtual desktop.

DISK VIRTUALIZATION operates on a Cache Appliance to present Binary Package file volumes to Composite Disk Device Driver file access requests.

DIVISION is a grouping of data or settings within a Binary Package.

MANAGED DESKTOP is the virtual desktop running on a computer using Composite Virtualization. A functioning Managed Desktop includes an operating system, a set of zero or more applications, and user data.

MANAGED MACHINE is the system running or used to run a Managed Desktop.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
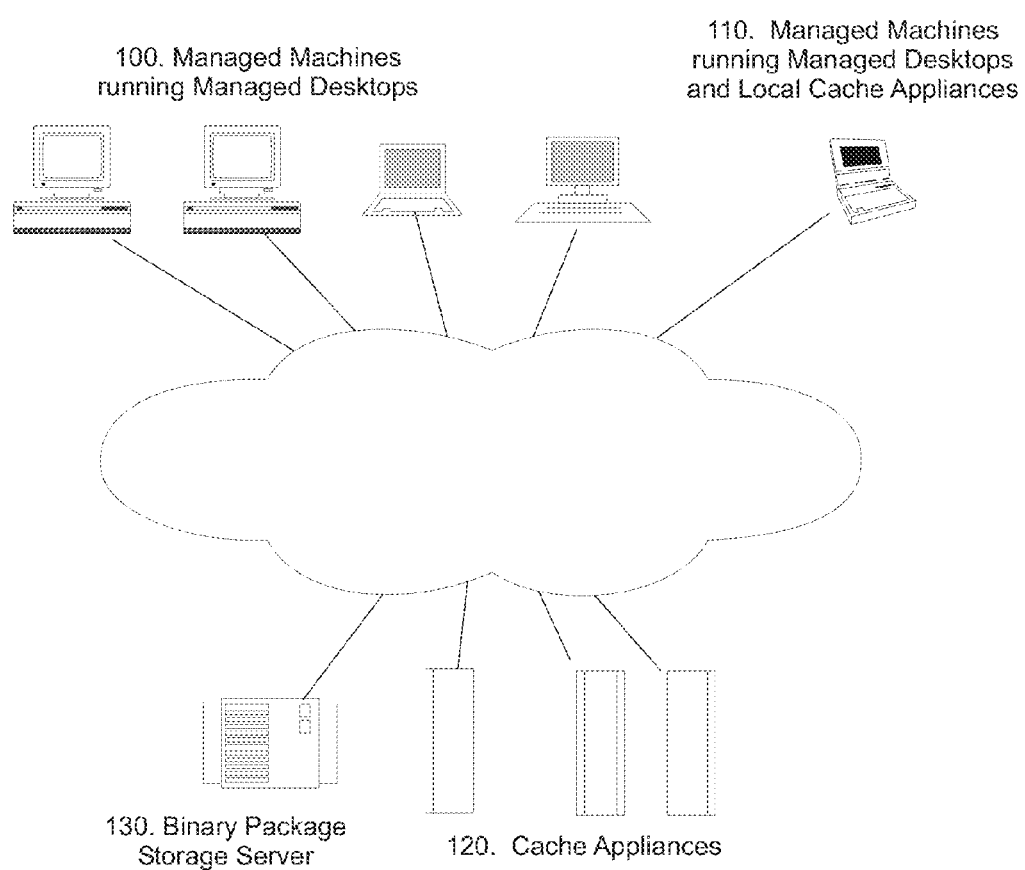
FIG. 1 shows a diagram of multiple Managed Desktops connected to multiple Cache Appliances across a network.
Figure 2:
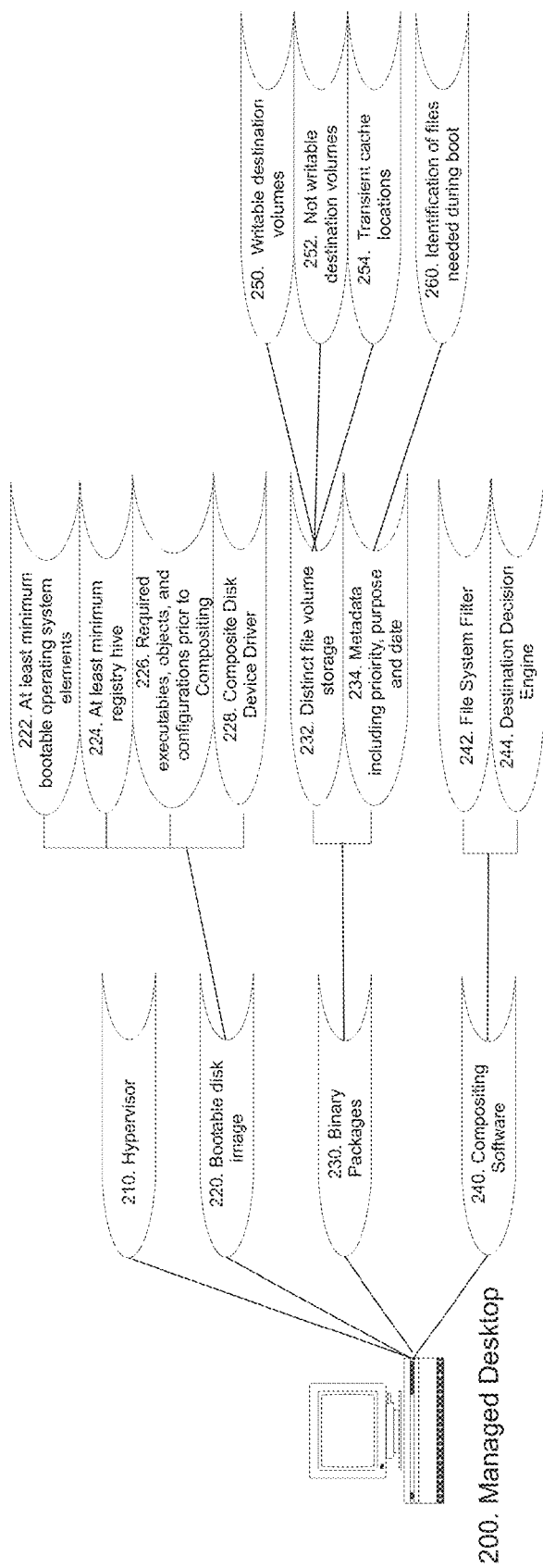
FIG. 2 shows a diagram of a Managed Desktop and its composite elements.
Figure 3:
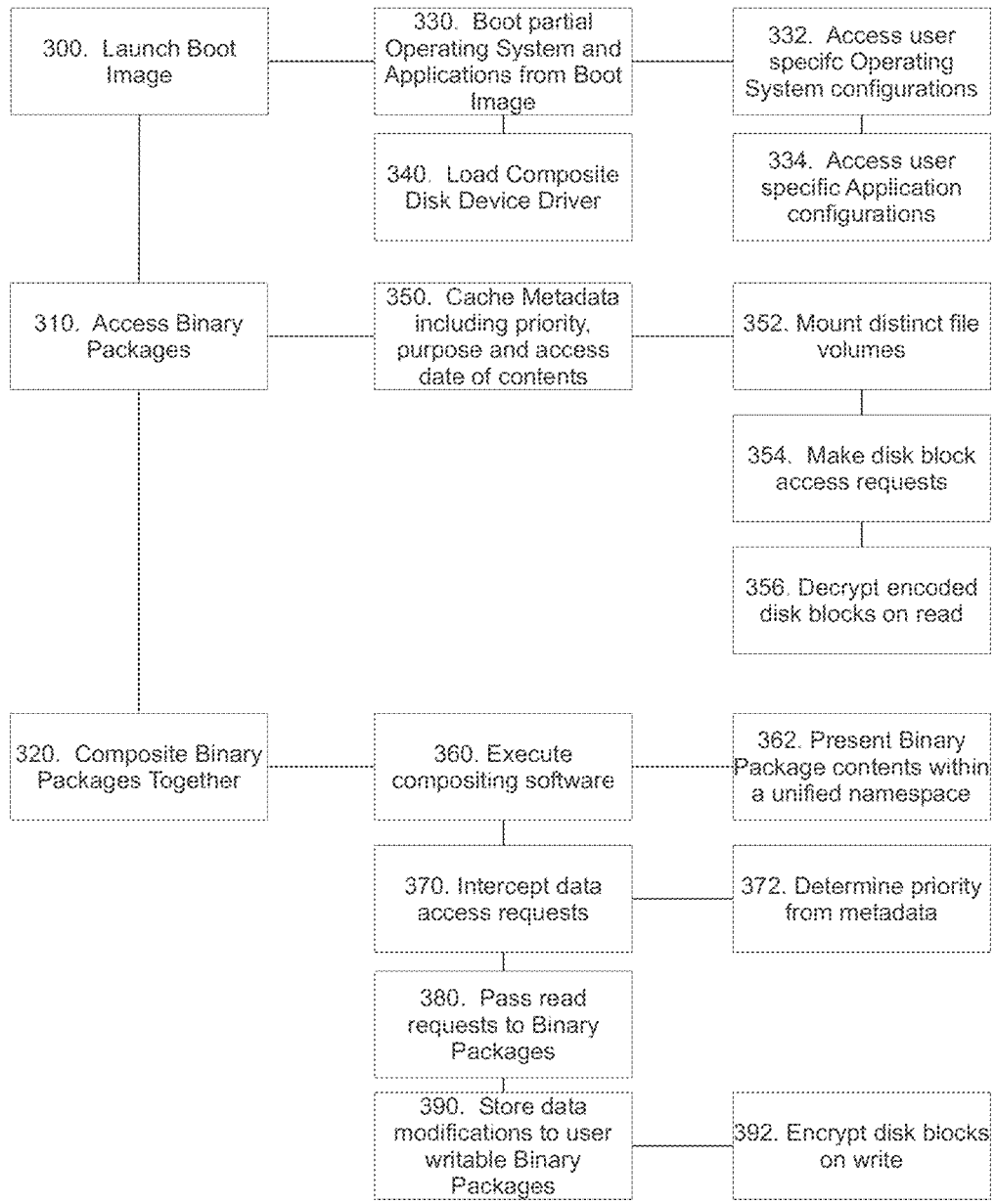
FIG. 3 shows a flowchart of operating a Managed Desktop.

This disclosure describes a system of computer desktop management and methods related to the system. The disclosure applies to a single user of a single computer, but is best embodied as a management system of a multi user computing environment. Referring to FIGS. 1, 2, & 3, Managed Machine 100, 110 runs Managed Desktop 200 for allowed system users. Managed Desktop runs programs, including operating systems and applications, and data stored on or accessed through Cache Appliance 120. Cache Appliance may act as an interface to storage or directly store such programs and data as Binary Packages. Managed Desktop may perform Composite Virtualization to composite 320 various Binary Packages 230 to present a functioning, individual computer desktop to a user that appears to be a normal desktop.

Cache Appliances are designed to provide access to Binary Packages for Managed Desktops. Binary Packages may be stored on Cache Appliances or on storage accessed through Cache Appliances. In order to scale and provide access to many users, multiple Cache Appliances may be needed. Hardware performance limitations may determine how many desktops a single Cache Appliance may serve, however there is no limit on to desktops served by multiple Cache Appliances. This may benefit with network latency across geographical diverse environments, provide mobile access in areas without networked connectivity, improve reliability by introducing redundancy, and improve Cache Appliance performance when accessed by many users. Physical system limitations such as disk access rates may be alleviated by adding additional Cache Appliances to the network. Reliability may be increased by allowing Managed Desktops to access alternate Cache Appliances in the case of hardware, network, or system failure. For multiple Cache Appliances to exist and co-operate, Binary Packages may be replicated and distributed between Cache Appliances. One embodiment may allow designation of a master Cache Appliance which distributes Binary Packages to all other Cache Appliances. Alternate embodiments may allow system administrators to allow any, or a subset, of Cache Appliances to replicate and distribute Binary Packages to other Cache Appliances. In this manner, system administrators may create, modify, or upgrade a Binary Package at a single Cache Appliance and distribute that Binary Package to all Cache Appliances, thereby providing the Binary Package to all applicable Managed Desktops.

Binary Packages are the building block used by Composite Virtualization to create functional Managed Desktops. Binary Packages are programs and data bundled together as system administrators want to make such programs and data available to users. Binary Packages may contain entire applications, including all necessary files, objects and data, subsets of applications, groups of applications, or other divisions of files and data as decided by system administrators. Binary Packages may be created by system administrators and deployed so that they may be accessible to Managed Desktops. During operation, Managed Desktops may composite Binary Packages into a user desktop including such programs and data as available in the Binary Packages. User access to Binary Packages may be fully allowed, or controlled by system administrators to limit which Binary Packages users may access or in what mode, including read-only or read-write, users may access.

One embodiment may create three types of Binary Packages, Operating System Binary Packages, Application Binary Packages, and Desktop Binary Packages. Operating System and Application Binary Packages may be write-enabled only by system administrators. Each Binary Package may contain all the data to be managed, tracked, and deployed without dependency on any other Binary Package. Binary Packages may contain all the data necessary to be fully operational after composition into Managed Desktop. Binary Packages may also contain metadata 234 about their contents, such as, but not limited to, priority, purpose, and modification date.

Operating System Binary Packages may contain bootable image 220 of a functional operating system, for example Windows Vista. Application Binary Packages may contain an installed version of an application, for example Microsoft Word. Desktop Binary Packages may contain user customization, personalization, saved data, user installed programs, and other stored data modifications for a Managed Desktop. Desktop Binary Package may include user specific configuration settings for an operating system and any applications that operate in the Managed Desktop. Storing saved data in Desktop Binary Package allows many users to use the same Operating System Binary Package or the same Application Binary Package, as only Desktop Binary Packages become user specific. In this fashion, Managed Desktop may use one Operating System Binary Package, one Desktop Binary Package, and a set of zero or more Application Binary Packages. This conserves storage required as only Desktop Managed Object storage scales with the number of Managed Desktop users.

An alternate embodiment may create multiple User Binary Packages for each user instead of a single Desktop Binary Package. For example, one or more User Binary Packages may store user created data files. An additional User Binary Package may be created for every application installed by the user. This separation into multiple Binary Packages may provide increased data separation and control for tracking, versioning, and rollback purposes.

Alternate embodiments may use similar classifications of Binary Packages but alter disk write access or what is contained in Desktop Binary Packages. For example, Application Binary Packages may allow temporary write access or files in Application Binary Packages could be marked to not be stored on write into Desktop Binary Packages. Thus any changes made by users to such files or data may be retained locally but not permanently written to the Application or Desktop Binary Package. Situations where such designation is desirable include, but are not limited to, internet caches stored by browser applications, or plug-in add-ons to applications.

Systems administrators or users with sufficient authorization permissions may create and determine the makeup of Binary Packages. An example embodiment for creating Binary Packages may include creating a blank Binary Package on a Cache Appliance and associating the created Binary Package as a writable Binary Package with a specific Managed Desktop. Programs and data to include in the Binary Package may then be installed on the desktop and written to the created Binary Package. Once complete, administrators may enable other users to access the installed Binary Package.

Each operating system or application an administrator deploys, tracks, and manages may reside in one Binary Package. Binary Packages may also include groups of programs. For example, the application Microsoft Word could be included in an Operating System Binary Package also containing Windows Vista. A Managed Desktop compositing this Binary Package would have both Windows Vista and Microsoft Word. Alternatively, two Binary Packages could be created, one an Application Binary Package containing Microsoft Word and the other an Operating System Binary Package containing Windows Vista. Bundling multiple applications into one Binary Package reduces the number of Binary Packages required to composite a Managed Desktop. However, creating separate Binary Package for every application generally provides more control and flexibility to system administrators. For example, an Operating System Binary Package could contain Windows Vista, and an Application Binary Package could contain Microsoft Word. Thus system administrators may allow users to composite either or both Binary Packages into a desktop. Alternatively, the Operating System Binary Package could contain both Windows Vista and Microsoft Word. In this case, any user allowed to access the Binary Package would receive both programs. If administrators also wanted to provide some users only access to Windows Vista, a second Operating System Binary Package containing only Windows Vista would be needed. Should Windows Vista require a patch or upgrade, systems administrators would need to patch or upgrade both Binary Packages containing Windows Vista. Thus, unless distribution of multiple applications to all users is always desirable, it may be beneficial to system administrators to create separate Binary Packages for every application. Administration concerns also factor into bundling decisions of Binary Packages. User rights may be assigned to allow specific users or groups of users access to different Binary Packages. Restricting Binary Packages to single applications allows for maximum user right control over user access to applications.

Binary Packages may also contain metadata about their contents, such as, but not limited to, priority, purpose, and modification date. Metadata may have multiple uses, including, but not limited too, compositing Binary Packages into a Managed Desktop and versioning Binary Packages. To further aid versioning, Binary Packages may be sub-divided into separately trackable divisions. For example, division between execution, settings, and data may be desirable. One embodiment may create three such divisions for every Binary Package: an Execution Division, a Settings Division, and a Data Division. Each division may be a stored as a separate file volume. For Desktop Binary Packages, the Execution Division may contain intended executable or binary objects which can execute machine level instructions and directly or indirectly affect operating system stability, such as, but not limited to, .exe, .dll, or .ocx files. The Settings Division may contain intended operating system objects outside normal file system access operations but providing settings or configurations, such as the Windows registry. The Data Division may contain all data and information not in the Execution Division or Settings Division. Divisions may be versioned by recording a collection of changes from a prior version point. User installed applications may be removed by selectively rolling back changes in the Execution Division while retaining all user created data by not rolling back the Data Division. As Desktop Binary Packages update whenever users alter or store data or configurations, Desktop Binary Package version points may be created at regular timed intervals, triggered by set events such as installation of an application, logging out, manually triggering, or created by other criteria. Version points may even be created at every change to a Binary Package, thereby allowing rollback control to every specific action. Alternative to sub-versioning Binary Packages with divisions, other versioning techniques may be used. For example, changes to every file may be tracked individually, rather than included as changes as a group to a division, allowing selective rollback to versions of specific files, preservation of changes to specific files while rolling others back to a prior version.

In contrast to Desktop Binary Packages, Application Binary Packages and Operating System Binary Packages may be relatively static. Snapshots or versions of Application Binary Packages and Operating System Binary Packages may be created by system administrators when upgrading or patching the Binary Package, or at other points determined by system administrators. System administrators may assign access to different versions or allow users to select access to a prior or future version Binary Package.

Composite Virtualization is the system of compositing Binary Packages together into a Managed Desktop that is a functional, customizable and individual desktop for a computer user. Composite Virtualization may begin during the boot process of an operating system by launching Composite File System. Composite File System is compositing software 240 executing 360 within an operating system booted to a point to allow control to intercept 400 and handle data access calls. Typically such data access calls are file access calls, although alternate data storage schemes, such as, but not limited to, database access or registry access may be similarly intercepted and handled by Composite File System. Control of file system access calls, such as through Windows file filters, occurs after file system drivers have been loaded by the operating system. Composite Virtualization also requires access to the Binary Packages to be composited. These Binary Packages may be accessed through Cache Appliances or directly. If accessed through networked Cache Appliances or directly on networked storage, network drivers loaded by the operating system may also be required to begin Composite Virtualization.

Figure 4:
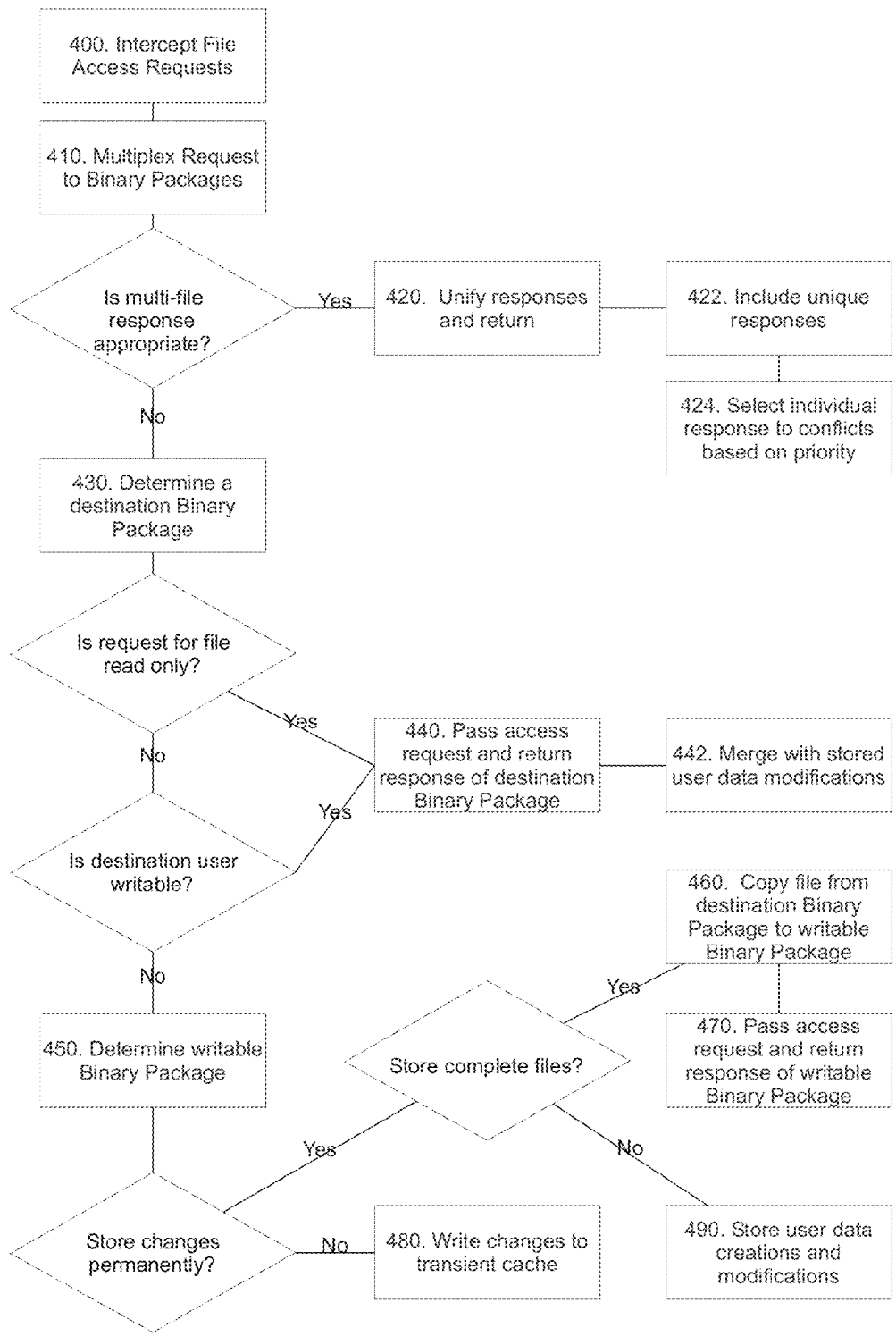
FIG. 4 shows a flowchart of performing Composite Virtualization to handle file access requests.

A first step may be to obtain a list of Binary Packages to be composited into Managed Desktop. In one embodiment, Composite File System may query Cache Appliance for such a list or for a list of all Binary Packages available through that Cache Appliance. In alternate embodiments, Composite File System may retain or access an identification list of storage locations for available Binary Packages. Composite File System may then utilize Composite Disk Driver to establish connections to access Binary Packages. Composite Device Disk Driver may be a virtual disk device driver for accessing virtual disks. Referring also to FIG. 3, after being loaded into the operating system, Composite Disk Device Driver may mount 352 each Binary Package volume as distinct file system volume 232 within the operating system under the appropriate file system driver, such as FAT or NTFS. Metadata about each volume, including, but not limited to, a priority, purpose, type of information identifier, and access date associated with the volume, may also be retrieved and cached 350. When all Binary Package file volumes needed by Managed Desktop have been mounted, Composite File System may attach to all mounted volumes and presents 362 them to Managed Desktop users as a single or multiple unified namespace rather than as many separate file volumes. Referring also to FIG. 4, Composite File System may operate as file system filter 242 to intercept 370, 400 all file access requests. Composite File System may also operate destination decision engine 244 to select appropriate file volume destinations for file access requests. Composite File System may then multiplex 410 intercepted requests to all mounted Binary Package volumes. Based on file system response, Composite File System may determine 372 a priority for which Binary Package volume to access. Such determined priority may be based on Binary Package metadata including, but not limited to, priority, purpose, and file modification date information relevant to the request. File system requests made by Composite File System are made to the mounted file system, which in turn makes device block requests 354 to Composite Disk Device Driver. Composite File System may merge and return all responses from file system requests as a unified response to the originating file access request. If multiple responses are appropriate to a disk access request, such as for a directory listing, Composite File System may unify 420 the response from all Binary Packages. If such unified response includes conflicts, such as the same file existing in multiple Binary Packages, Composite File System may select 424 based on priority which conflicted responses to include 422 with unique responses in the unified result. If a single disk access is requested and the requested file exists in multiple Binary Packages, Composite File System may determine 430 a priority identifying an appropriate destination Binary Package volume based on metadata such as priority, purpose, and file modification date. Read requests may be passed 380, 440 to and returned from Composite Disk Device Driver for the destination Binary Package volume. Write requests may be handled in different fashions. Write requests may be handled the same as read requests, with the write request passed 440 to and returned from Composite Disk Device Driver for the destination Binary Package volume. Alternatively, writable status may be queried for the destination Binary Package volume or determined 450 based on user privileges, with write requests passed to and returned from writable destination Binary Package volumes 250. If the destination Binary Package volume is not writable destination volume 252, a second destination volume that is writable may be determined. The applicable file may be copied 460 from the original to the second destination volume, and the write request may be passed 470 to and returned from the second destination volume. In an embodiment allowing write access only to Desktop Binary Packages, if a file request is to open the file for write access, that file must exist in the Desktop Binary Package as only the Desktop Binary Package may be writable by the Managed Desktop. If the file does not exist in the Desktop Binary Package, the file may be created in the Desktop Binary Package with metadata and contents copied from the existing destination Binary Package. Once the file exists in the Desktop Binary Package, file access, including writes, may continue to that file. With a single Desktop Binary Package per Managed Desktop, all data created or modified by a user may be stored 390 in a single Desktop Binary Package. With multiple Desktop Binary Packages per Managed Desktops, user modified or created data may be stored 390 in separate Desktop Binary Packages based on determinable criteria such as application association, allowing increased data separation and control for tracking, versioning, and rollback purposes. In an alternate embodiment, instead of copying the file to the Desktop Binary Package, Desktop Binary Package may store 490 modifications to the file. In such an alternate embodiment, read requests for files having modifications stored in the Desktop Binary Package may be passed to both the destination Binary Package volume and the Desktop Binary Package, with the returned result merged 442 from the destination response with data modifications from the Desktop Binary Package. In another embodiment, entire Binary Packages or subsets identified by metadata may be designated as temporary or disposable, for which Composite File System may write changes 480 to local transient cache location 254 rather than a permanent Binary Package. Such changes may be retained until Managed Machine resets or a user session terminates.

For Managed Desktops using an Operating System Binary Package containing a Windows operating system, a similar compositing software to Composite File System may exist to intercept calls accessing the Windows Registry. For performance reasons it is desirable to keep the Windows Registry on the local system, and therefore a full copy of the Windows Registry may be included in Boot Image used to boot the operating system. Registry Splitter may intercept all calls to the Windows Registry and modify both the Registry stored in Boot Image and also to the Desktop Binary Package. This Registry duplication gains the performance benefits of a local registry and retains a registry copy which may be used in building or rebuilding boot disks for the Managed Desktop. Alternate embodiments may operate without a complete registry copy on Boot Image, but rather a registry composited during operation by Registry Splitter. Similar operation may be extended to alternative operating systems or application utilizing data organization schemes, such as database storage, that differs from traditional file system storage.

Figure 5:
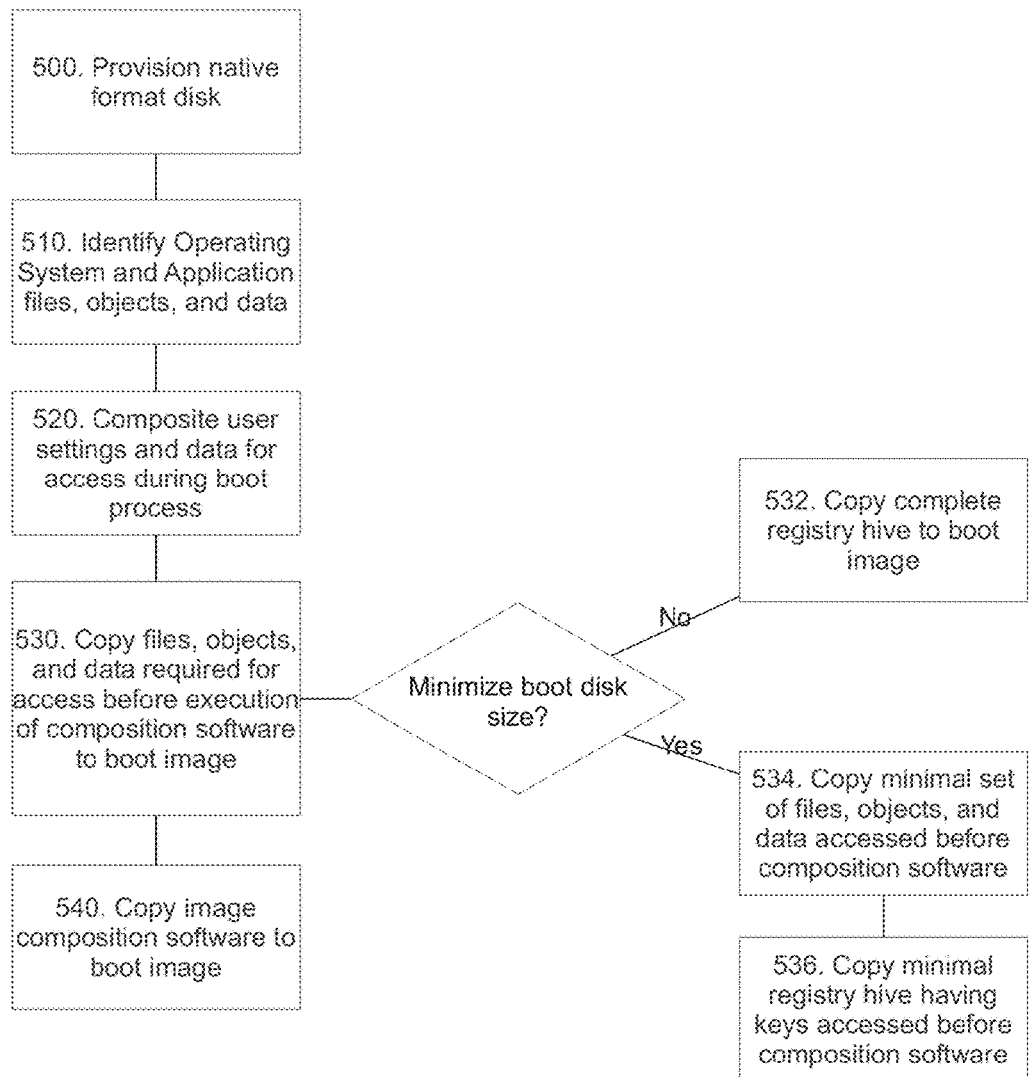
FIG. 5 shows a flowchart of creating a Boot Image.
Figure 6:
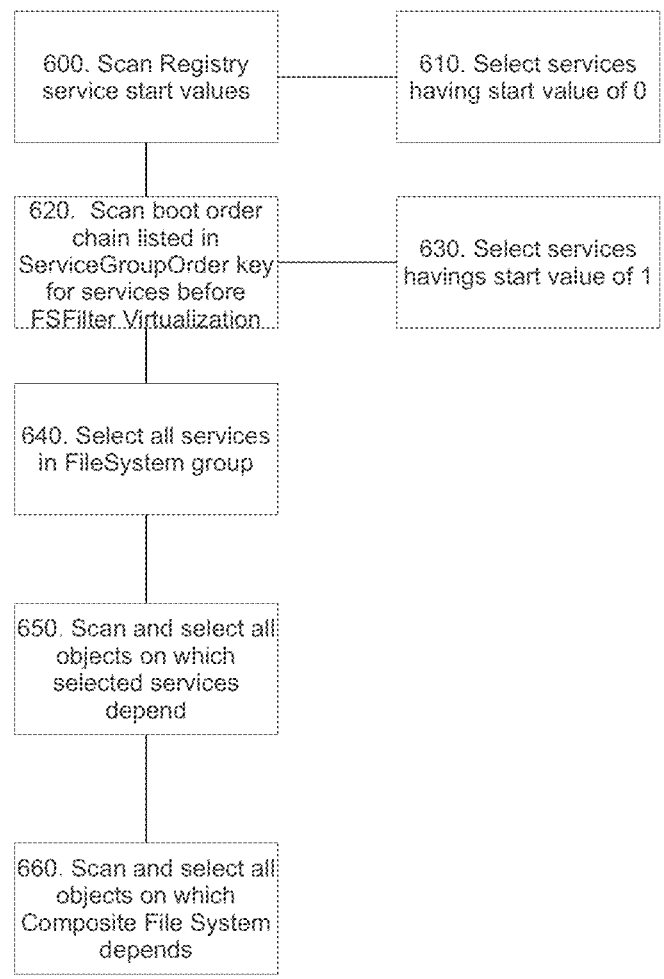
FIG. 6 shows a flowchart of selecting which objects to include in a Boot Image.

A Managed Desktop operating system may be launched 300 from Boot Image. Referring also to FIG. 5, Embodiments of Boot Image may include provisioning 500 a bootable virtual disk in a format native to virtual hypervisor 210, such as, but not limited to, Xen or ESX, or network boot. Alternatively, Boot Image may be provisioned 500 as a bootable disk for operating on any given hardware, independent of a virtual hypervisor. As Composite Virtualization functions by compositing various file volumes together, and intercepting file access or registry calls and redirecting them to the composited file volumes, some operating system functionality is required before Composite File System can begin operating. By customizing Boot Image to each individual Managed Desktop, Composite Virtualization extends composition to the boot process and may customize all aspects of Managed Desktops for the user, including a user's specific configuration settings of operating systems, applications, and other programs which launch prior to enabling Composite File System. Similarly, some applications, such as virus protection software, may require files loaded or executed before Composite File System can be loaded. Boot Image may contain for booting 330 a partially bootable operating system with copies 530 of files, objects, and data including configurations 226 specific to a user's Managed Desktop identified 510 as necessary for operating system and application operation and access 332, 334 until Composite File System can be loaded to access and composite Binary Packages. All operating system and application data and settings needed as part of operation or boot process after loading Composite File System need not be included on Boot Image. Such data and settings may instead be accessed 310 from appropriate Binary Packages. For disk space purposes and maximizing performance time in creating Boot Image, copying 534 to Boot Image the minimal set 222 of operating system and application files, objects, and data along with Composite File System software may be preferred. Alternatively, more than the minimal set may be copied to Boot Image to improve booting performance or for other reasons.

Boot Image may be created to instantiate a new Managed Desktop, after modification through addition, removal, upgrade or patch of a Binary Package used by the Managed Desktop started by Boot Image, or upon any other request to create a fresh Boot Image. For optimal performance when using a Windows operating system, Boot Image may also contain a full copy of the Windows Registry used by the Managed Desktop. Boot Image may be created by starting with a clean native format disk for any environment, such as .VMDK for operating with a VMWare hypervisor. Migration between hypervisor platforms may be done by creation of a new Boot Image in the appropriate format. The disk is formatted, for example with a Windows file system driver such as FAT or NTFS. Operating system files, folders, and configuration data may be copied from an Operating System Binary Package to Boot Image. To minimize the size and time to create Boot Image, files copied may be limited to those required to process booting the operating system to load and operate Composite File System. For Windows operating systems, the Windows Registry for a user's Managed Desktop may also be copied 532 to Boot Image from the Operating System Binary Package. Such a copy may include a complete registry hive, or alternatively a copy 536 of only a minimal set 224 of registry keys necessary for access by Windows and other applications until Registry Splitter may load and operate, thereby obtaining and compositing remaining registry keys from Binary Packages. After this minimum operating system copy is complete, existing Binary Packages which will be used in Managed Desktop may be queried for metadata identifying files 260 marked as required for execution or access during boot prior to operation of Composite Virtualization. Such files may also be copied to Boot Image from their Binary Packages. Additionally, Binary Packages may be queried for registry settings and responses made to the registry copy on Boot Image. An alternative embodiment of Boot Image creation may logically composite all Binary Packages for Managed Desktop and identify and copy all data and settings necessary for booting the operating system until Composite File System may load and operate.

One embodiment for determining which data and settings to include on Boot Image involves determining the dependencies of all programs and services that will launch during the boot process up to and including operation of Composite File System. For a Windows operating system, this may be done based on services identified and selected from the Windows Registry and objects on which they depend. Services may be selected 610 by scanning 600 the registry for services having a start value of 0. Scanned 620 services may also be selected 630 with a start value of 1 and listed in the registry's ServiceGroupOrder key before the FSFilter Virtualization group. All services in the FileSystem group may also be selected 640. All selected services may be included as needed for operation prior to Composite File System. All objects which these services depend on, and objects which Composite File System depends on, may also be selected 650, 660 for inclusion in Boot Image. Such dependency may be scanned and determined by a utility or operation, such as Microsoft's Process Explorer. For alternative operating systems, dependency determination may require other utilities or operations, such as ldd for unix systems. As data, files and objects for inclusion in Boot Image come from various Binary Packages, during creation of Boot Image such data, files and objects identified for inclusion may be composited 520 in the same manner Composite File System operates. In this fashion, Virtual Composition is extended to the entire Managed Desktop, including elements accessed before Composite File System begins operation. Determinations for inclusion in Boot Images may be made when Binary Packages compositing a Managed Desktop are added, patched, or modified. Application or configuration changes, including both user or system administrator initiated, which require inclusion prior to operation of Composite File System are thereby incorporated into Boot Image, creating a specific Boot Image for every Managed Desktop. Moving a Managed Desktop from one virtual hypervisor platform to another, or to a new hardware system, may be done by rebuilding Boot Image for the desired operating environment.

In addition to user-specific operating system and application data and configuration, software for performing composition, including Composite Disk Device Driver 228, may also be copied 540 to Boot Image to be loaded 340 into Managed Desktop. As this software is copied during Boot Image creation, which may be done at any time from a Cache Appliance, any changes to the Boot Image including updates to the compositing software may be done by distributing such changes to the Cache Appliance and then creating a new Boot Image the next time a Managed Desktop begins.

In one embodiment, Cache Appliance is designed to store and provide Binary Packages to connecting Managed Desktops. As individual settings are stored in Desktop Binary Packages, Cache Appliance may store a Desktop Binary Package for each connecting Managed Desktop. As Operating System Binary Packages and Application Binary Packages may be shared by many Managed Desktops, Cache Appliance may store one Operating System Binary Package for each different operating system run by connecting Managed Desktops, and as many Application Objects needed to provide all applications run by connecting Managed Desktops. Thus data unique to an individual user desktop may be stored in a unique Desktop Binary Package, but application or operating system data that is not unique to a single user may be stored in a single Binary Package for access by multiple users at the same time, thereby minimizing storage requirements. Backup requirements are also minimized, as Desktop Binary Packages may be backed up separately from other Binary Packages, thereby limiting back up storage requirements to unique user desktop data.

Cache Appliance may operate Disk Virtualization to provide Binary Packages to Managed Desktops. Disk Virtualization may manage thin provisioned virtual disks and may present Binary Package divisions as separate file system volumes. Composite Disk Device Driver on Managed Desktop may establish a connection to Cache Appliance for each Binary Package file system volume needed. Composite Disk Device Driver may make disk block requests, enabling Disk Virtualization to provide data access without knowledge of file system format of Binary Package file volumes. Disk Virtualization may encrypt 392, compress, decrypt 356, or decompress each disk block on access without knowledge of the rest of the file to provide security or storage maximization options. Thin provisioning virtual disks allows allocation of disk sectors just in time to respond to data requests, and this helps minimize disk storage requirements of Cache Appliances. Storage blocks need only be allocated for writing new data, minimizing storage requirements of applications and operating systems to only the disk space required for each Binary Package. Binary Package versioning may also be accomplished by creating a snapshot or image of a virtual disk at any designated point in time. Versioning may be done periodically or may be triggered by systemic events such as upgrade or patch application.

In an alternate embodiment, Cache Appliance may be an interface to storage alternatives, such as network attached storage, and not directly address block level storage. In an additional embodiment, Composite Disk Device Driver may directly access storage without interfacing with Cache Appliance.

Cache Appliances may be configured by administrators in different fashions to serve different organizational needs. For example, an administrator could deploy all Binary Packages to a single Cache Appliance serving an entire organization of users. Alternatively, an administrator could configure multiple Cache Appliances, deploying subsets of Binary Packages to each Cache Appliance, the subset specific to a group of users all having access to the same Binary Packages. Organizations having multiple geographic locations could deploy Cache Appliances containing copies of the same Binary Packages at different locations. Administrators may then deploy upgrades, patches, or new Binary Packages to all applicable Cache Appliances. In one embodiment, Cache Appliances may replicate and distribute Binary Packages to other Cache Appliances, allowing system administrators to manage a Binary Package on just a single Cache Appliance and let it propagate to other Cache Appliances. Multiple Cache Appliances also allows redundant reliability, as Managed Desktops may switch connection to an alternate Cache Appliance should a connected Cache Appliance shut down, fail, encounter an error condition, or otherwise become unavailable. Further, Cache Appliances may be deployed on any system, including those running Managed Desktops. Thus mobile computers, such as laptops, may operate Managed Desktops and also contain Cache Appliances to provide Binary Packages. Managed Desktops on mobile computers containing Cache Appliances may communicate with the local Cache Appliance, which may receive Binary Package upgrades, patches, and fresh installs when networked to other Cache Appliances. In an alternate embodiment, a laptop may connect to networked Cache Appliance when available and to a local Cache Appliance on the same laptop when a networked Cache Appliance is not available. This mobility allows Managed Desktop users to move between different physical locations and continue operating Managed Desktops without requiring network connectivity to the same Cache Appliance, and allows for automatic backup of Desktop Binary Packages when mobile computers are networked to other Cache Appliances. Applications installed on mobile and disconnected Managed Desktops may be retained solely in the Desktop Binary Package, or with sufficient administration permissions installed as a new Binary Package, and may be replicated and distributed to other Cache Appliances when the mobile Managed Desktop is reconnected to the network.

Mobility creates risk of data loss and lost control of applications operating on mobile computers running dedicated Cache Appliances. To protect data, Cache Appliances may encrypt all or some of the stored data. Composite File System may require proper authentication, such as, but not limited to, a password, GPS device, or smart token, before mounting encrypted Binary Package volumes or before decrypting data stored and accessed on encrypted volumes. As Cache Appliances may store data based on disk block access requests, without awareness of underlying file structure or file systems, encryption, decryption and data compression may also be done at the disk block level on every disk block access.

In an embodiment supporting Windows operating systems, Cache Appliance may also operate Registry Virtualization to accept registry modifications made by Managed Desktop and store the registry changes in Desktop Binary Package. Registry Virtualization may also provide the registry changes when queried during creation of Boot Image or during registry composition. In alternate embodiments equivalent operations to Registry Virtualization may accept, store, and access data or settings stored in alternatives of traditional file storage, such as, but not limited to, database storage.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of creating a Boot Image for a computer, comprising:
    identifying an operating system and a set of applications having files, objects, and data that is used by a user-specific computer desktop;
    copying to said Boot Image a compositing software; and
    copying to said Boot Image a minimal set and no more of all files, objects, and data including user-specific configurations required for access by said operating system and said set of applications booted partially not to a fully booted operating system environment but only to a point where the compositing software may execute to intercept and handle data access calls made within said operating system.

2. The method of claim 1, further comprising copying a complete registry hive to said Boot Image, wherein said registry hive is specific to said user-specific computer desktop.

3. The method of claim 1, further comprising
    copying a registry hive to said Boot Image, wherein said registry hive contains a minimal set of keys and settings specific to said user-specific computer desktop required for access by said operating system and said set of applications before said corn positing software may execute.

4. The method of claim 1, further comprising compositing user specific data and settings for access by said operating system and said set of applications before said compositing software may execute.

5. The method of claim 1, further comprising provisioning said Boot Image for operation within a virtual hypervisor as a native format virtual disk.

* * * * *